United States Patent [19]
Dey et al.

[11] Patent Number: 5,361,129
[45] Date of Patent: Nov. 1, 1994

[54] METHOD OF ASSESSING A SURFACE FIGURE OF AN OPTICAL ELEMENT

[75] Inventors: Thomas W. Dey, Springwater; Jennifer A. LeBaron, Rochester, both of N.Y.

[73] Assignee: Eastman Kodak Company, Rochester, N.Y.

[21] Appl. No.: 123,388

[22] Filed: Sep. 20, 1993

Related U.S. Application Data

[63] Continuation of Ser. No. 853,478, Mar. 18, 1992, abandoned.

[51] Int. Cl.$^5$ ................................................ G01B 9/00
[52] U.S. Cl. ................................. 356/124; 359/727; 356/359
[58] Field of Search ............... 356/124, 124.5, 125, 356/126, 127, 153, 359–360; 359/727, 869, 641, 728

[56] References Cited

U.S. PATENT DOCUMENTS

| | | | |
|---|---|---|---|
| 3,518,004 | 6/1970 | Brewer | 356/124 |
| 3,736,060 | 5/1973 | Mayo | 356/124 |
| 4,571,036 | 2/1986 | Grebelein et al. | 359/727 |
| 4,718,753 | 1/1988 | Grebelein | 359/727 |

FOREIGN PATENT DOCUMENTS 0115461  8/1984  European Pat. Off. ............ 356/125

*Primary Examiner*—Richard A. Rosenberger
*Assistant Examiner*—Hoa Q. Pham
*Attorney, Agent, or Firm*—Thomas H. Close

[57] ABSTRACT

A novel method for assessing a surface figure of an optical element. The method preferably comprises subjecting the optical element to a classical autocollimation testing procedure for ascertaining its surface figure relative to a predetermined ideal. The testing procedure is characterized by a step of modifying the classical optical testing procedure, so that the optical element under test simulates a paraboloid.

5 Claims, 6 Drawing Sheets

TABLE

RITCHEY - CHRÉTIEN PRIMARY MIRRORS (EXAMPLES)

|  | A | B |
|---|---|---|
| DIAMETER | 100 IN. | 200 IN. |
| F* | 2.1 | 1.4 |
| R | 420 | 560 |
| CONIC CONST (K) | -1.021 | -1.013 |
| ASPHERIC DEPARTURE* | 92 | 667 |
| APARABOLIC DEPARTURE* | 2.3 | 9.3 |

*BEST FIT PEAK-TO-VALLEY SURFACE DEPARTURE MEASURED IN WAVELENGTHS OF HELIUM-NEON LASER LIGHT AT 0.6328 MICROMETER WAVELENGTH.

FIG. 4

METHOD OF ASSESSING A SURFACE FIGURE OF AN OPTICAL ELEMENT

This is a continuation of application Ser. No. 07/853,478, filed on Mar. 18, 1992 now abandoned.

FIELD OF THE INVENTION

This invention relates to a method for assessing a surface figure of an optical element.

INTRODUCTION TO THE INVENTION

Methods for assessing a surface figure, as characterized, for example, by a vertex radius of curvature R, a conic constant k, or, an algebraically related conic eccentricity $\epsilon$, of an optical element, for example, a primary mirror of a conventional telescope, are known.

One objective of such a method is to expedite a fabrication process of the optical element, so that, by way of, for example, standard polishing techniques, a method discerned actual surface parameter, $k_a$, can be compared to a desired or idealized surface figure, $k_i$, to an end of converging on an optimal null, $|k_a-k_i|=0$.

Further particulars and illustrations of such assessing methods are disclosed, for example, in Shannon, R. R. et al: Applied Optics and Optical Engineering, Vol. VIII, pages 80–85, Academic Press, New York, 1980; and, Malacara, D., Optical Shop Testing, Chapter 14 and Appendix 4, John Wiley and Sons, New York, 1978.

SUMMARY OF THE INVENTION

As alluded to above, methods for assessing a surface figure may include such assessments of a primary mirror of a conventional telescope. The choice of a particular assessment methodology includes considerations of a particularly chosen telescope.

For example, it is known to employ an autocollimation assessing methodology to a Newtonian telescope (FIG. 1, numeral 10) comprising a paraboloidal primary mirror 12. As shown in FIG. 2, the autocollimation assessing method can be used to compare the FIG. 1 paraboloidal primary mirror 12 conic constant $k=-1.0$, to an idealized "aspheric departure", $k=0$.

As a second example, it is also known to employ a surface figure assessing methodology to a Ritchey-Chrétien two mirror telescope 14 (FIG. 3) comprising a hyperboloidal primary mirror 16. Important such assessing methodologies for the telescope 14 include inter alia: (1) a conventional Foucault knife-edge test; (2) a Hartmann test; (3) a wire test; or (4), an interferometric test. For each such methodology, (and again, with reference to FIG. 2), one can compare a hyperboloidal primary mirror 16 conic constant $k_a$, to the idealized "aspheric departure", $k=0$.

We now make the following critique of the preceding conventional methodology comprising aspheric departure, as it may be applied to an optical element comprising an hyperboloid, or, additionally, a prolate ellipsoid.

With reference to FIG. 2, we preliminarily note that the extant methodologies are based on a conceit of making an hyperboloid ($k<-1.0$) "like" a sphere ($k=0$) (i.e., traditional "aspheric departure"). However, by now referencing a FIG. 2 paraboloid ($k=-1.0$), we note, for the first time, that an aparaboloidal departure may be a more meaningful and suitable metric of testability for the hyperboloid or prolate ellipsoid, compared to an aspheric departure, since the paraboloidal surface topology may be observed to be geometrically closer to the hyperboloidal surface topology, than the spherical surface topology.

A critique of the conventional methodology comprising aspheric departure, for the case of an hyperboloid or prolate ellipsoid, follows accordingly: that it may be "harder" to make an hyperboloid look like a sphere compared to a paraboloid, thus disadvantageously requiring, for example, more testing lenses, and more severely shaped testing lenses, than a methodology which assesses an hyperboloid for its aparaboloidal departure.

These last points may be confirmed by reference to a Table set out in FIG. 4. The Table comprises computed and tabulated departures for two Ritchey-Chrétien hyperboloidal primary mirrors A,B, of first and second diameters, respectively; their departures relative to a best-fit sphere, and relative to a best-fit paraboloid.

The Table computations show that an aparaboloidal departure is a small percentage of the aspheric departure. That is, for the vast majority of Ritchey-Chrétien hyperboloidal primary mirrors comprising a conic constant k close to $k=-1.0$, the primary mirror is much closer to the paraboloid ($k=-1.0$), than to the sphere ($k=0$). This suggests to us, that because the paraboloid has an ideal null test (the autocollimation configuration), an aparaboloidal departure may be a more meaningful assessing methodology for assessing a surface figure of an optical element, than heretofore comprehended.

Accordingly, based on these insights, we now disclose a novel method for assessing a surface figure of an optical element. The novel method of the present invention comprises the steps of:

(a) subjecting the optical element to a classical collimation testing procedure for ascertaining its surface figure relative to a predetermined ideal;

the testing procedure characterized by a step of:

(b) modifying the classical optical testing procedure so that the optical element under test simulates a paraboloid.

The novel method, compared to prior art methodologies, can realize important advantages, including inter alia:

1) providing simplification in the number of lenses required to employ an autocollimation method;
2) eliminating heretofore typically required severely shaped lenses;
3) providing an efficient capability for assessing a surface figure of larger, faster and more aggressive i.e. more aspheric optical elements; and
4) providing correction capabilities for better than 0.001 waves of visible light surface departure from ideal, for example, compared to prior art corrections frequently measured as 0.01 waves.

BRIEF DESCRIPTION OF THE DRAWING

The invention is illustrated in the accompanying drawing, in which:

FIG. 4 shows a Table comparing aparaboloidal departures versus aspheric departures for two Ritchey-Chrétien primary mirrors;

DETAILED DESCRIPTION OF THE INVENTION

We first turn our attention to preferred aspects of the method of the present invention.

Preamble: A method for assessing a surface figure of an optical element.

The optical element may comprise a conventional lens, a conventional diffraction grating, or a conventional mirror, for example, a primary mirror of a Ritchey-Chrétien telescope The optical element may define a concave conicoid geometry, for example, an hyperboloid or a prolate ellipsoid. In a degenerate case, the optical element may define a paraboloidal geometry.

The surface figure (or topology) of the optical element may comprise, for example, a conic constant, k, typically specified, for example, as some such parameter as "k= −1.021", or, an algebraically related eccentricity, $\epsilon$.

Step A

Subjecting the optical element to a classical collimation testing procedure for ascertaining its surface figure relative to a predetermined ideal.

The classical collimation testing procedure may comprise inter alia:
1) a conventional Foucault knife-edge test;
2) a conventional Hartmann test;
3) a conventional wire test; or
4) a conventional interferometric test.

Step B

Modifying the classical optical testing procedure so that the optical element under test simulates a paraboloid.

Figure 1:
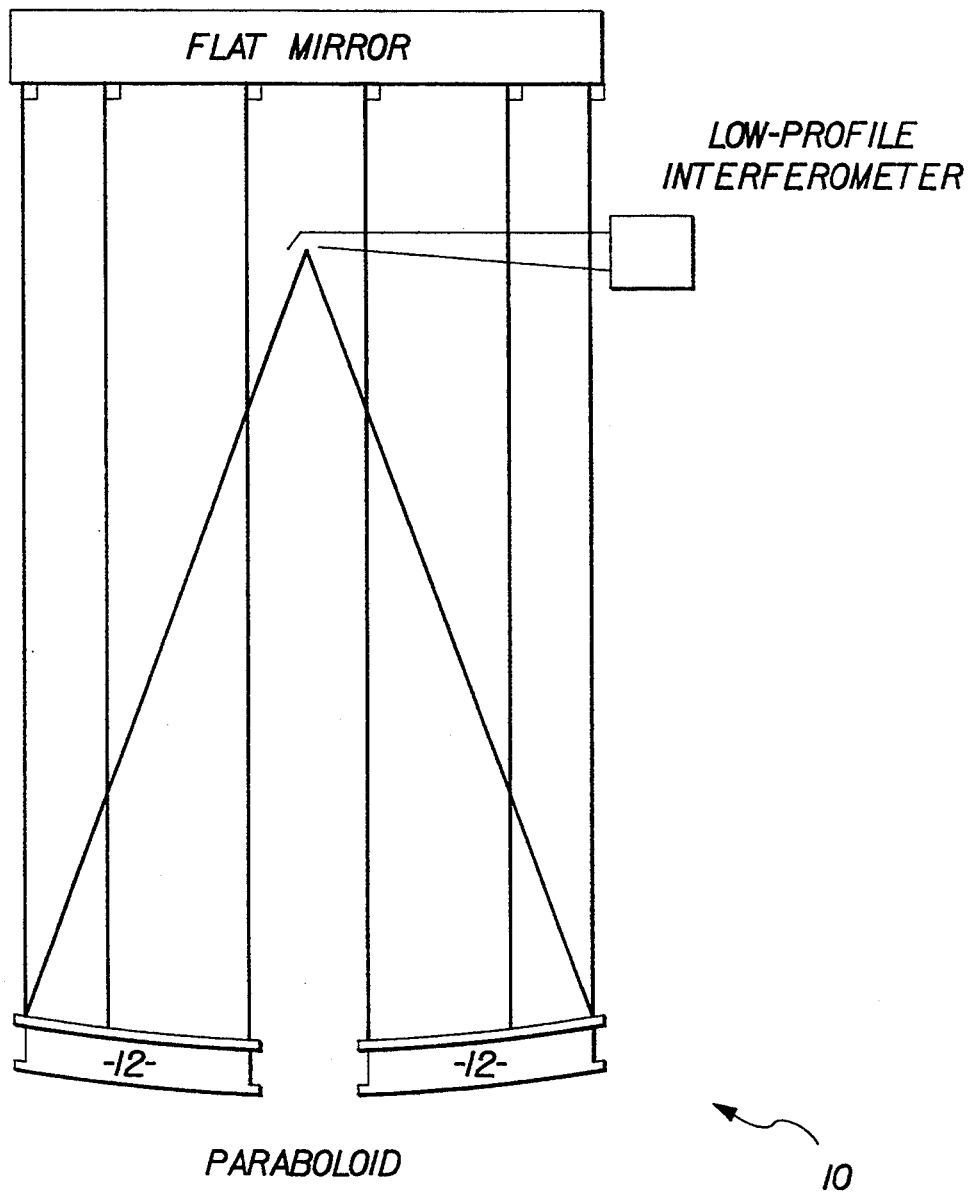
FIG. 1 shows a schematic of a Newtonian telescope primary mirror test configuration.
Figure 2:
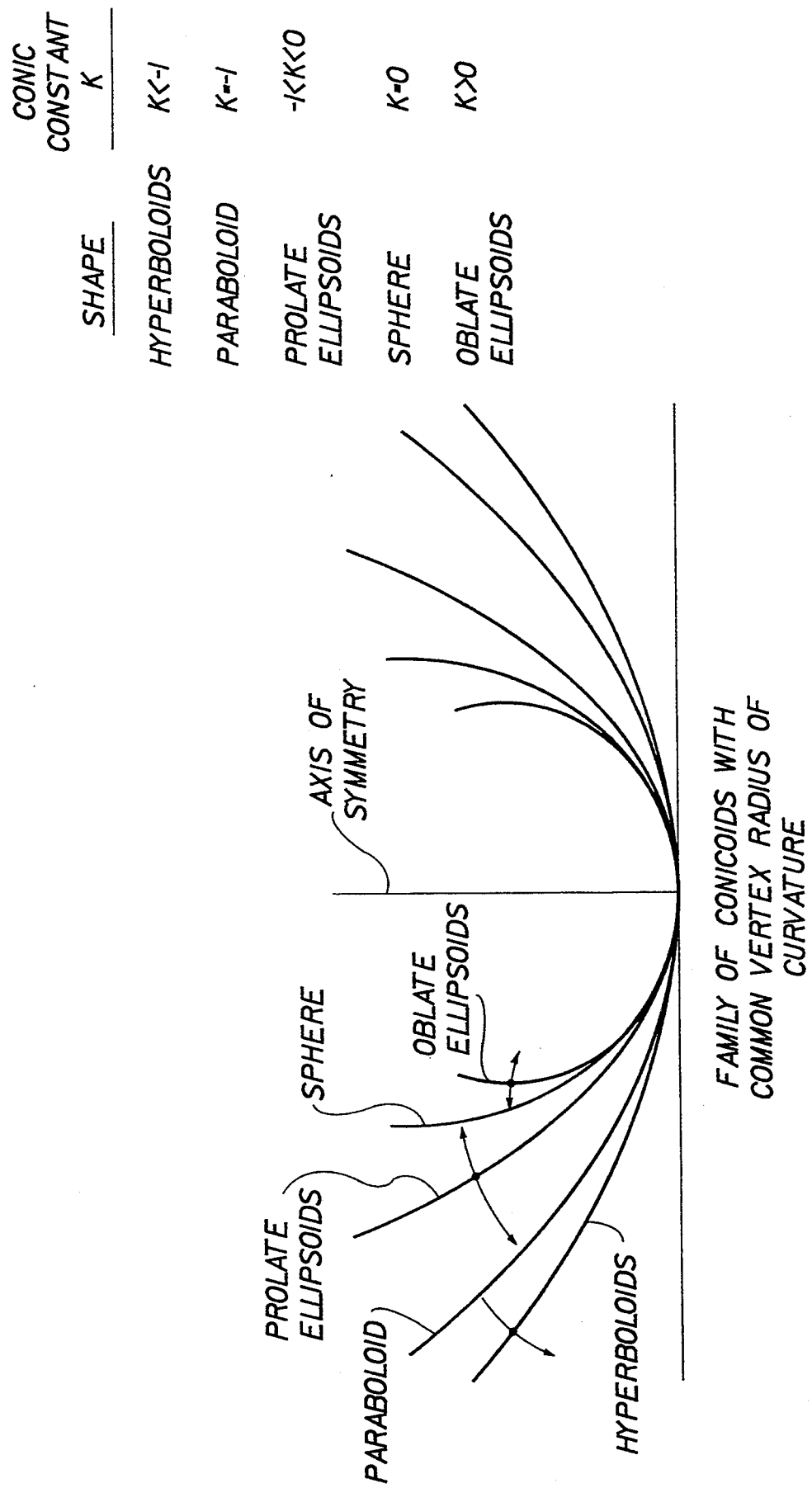
FIG. 2 shows a family of concave conicoids.
Figure 3:
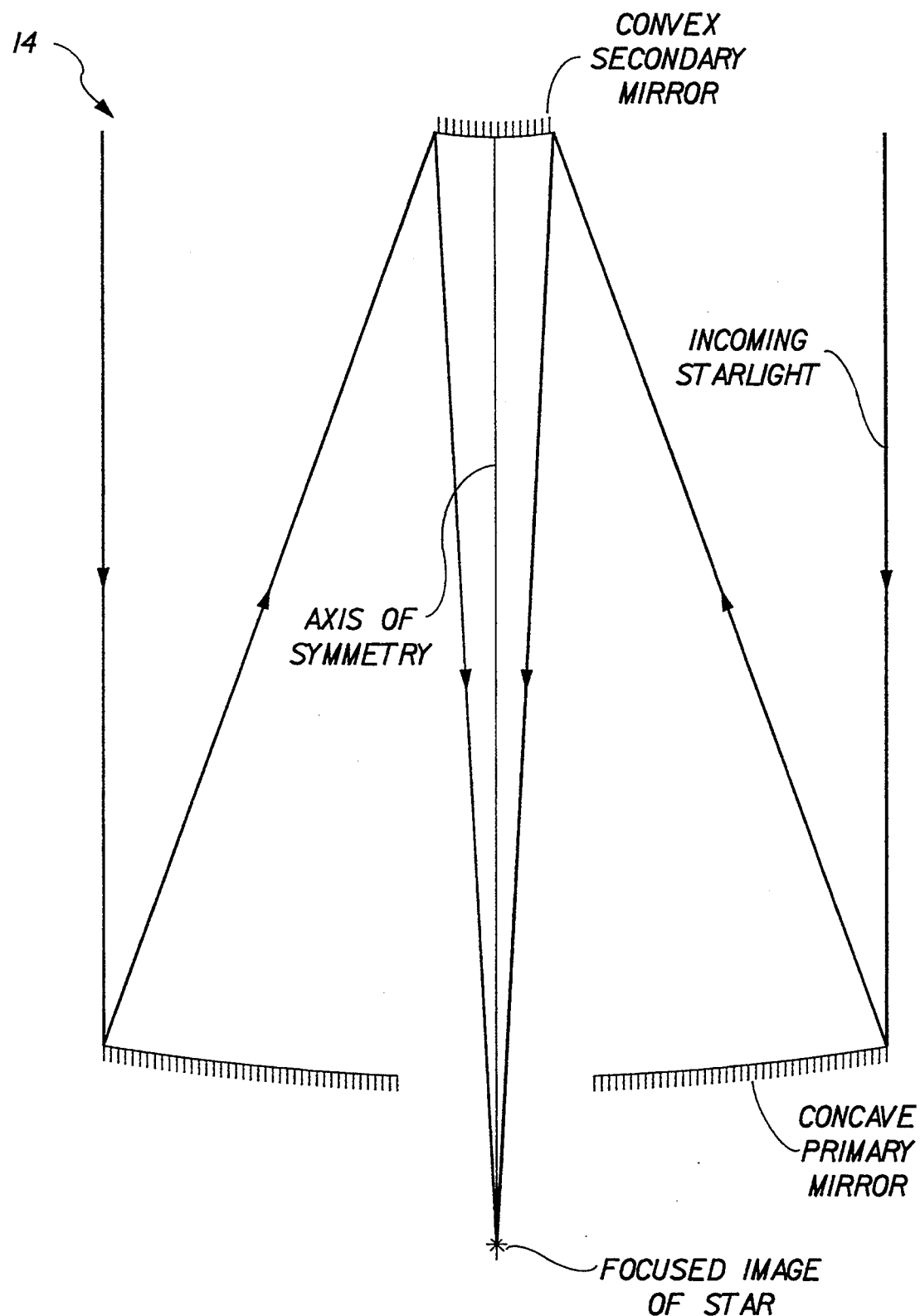
FIG. 3 shows a schematic of a Ritchey-Chrétien telescope.

Step B functions to qualify step A, thereby creating a pseudo-autocollimation test. The point of this qualification is to effect a suitable metric of testability of the optical element, so that its geometry may be referenced for its aparaboloidal departure (recall FIG. 2, supra), within the context, otherwise, of a classical optical testing procedure.

A preferred means for effecting such a pseudo-autocollimation test is set forth immediately below, (FIG. 5), in the context of an illustrative optical assembly 18 that may be employed to realize preferred steps of the method of the present invention.

Figure 5:
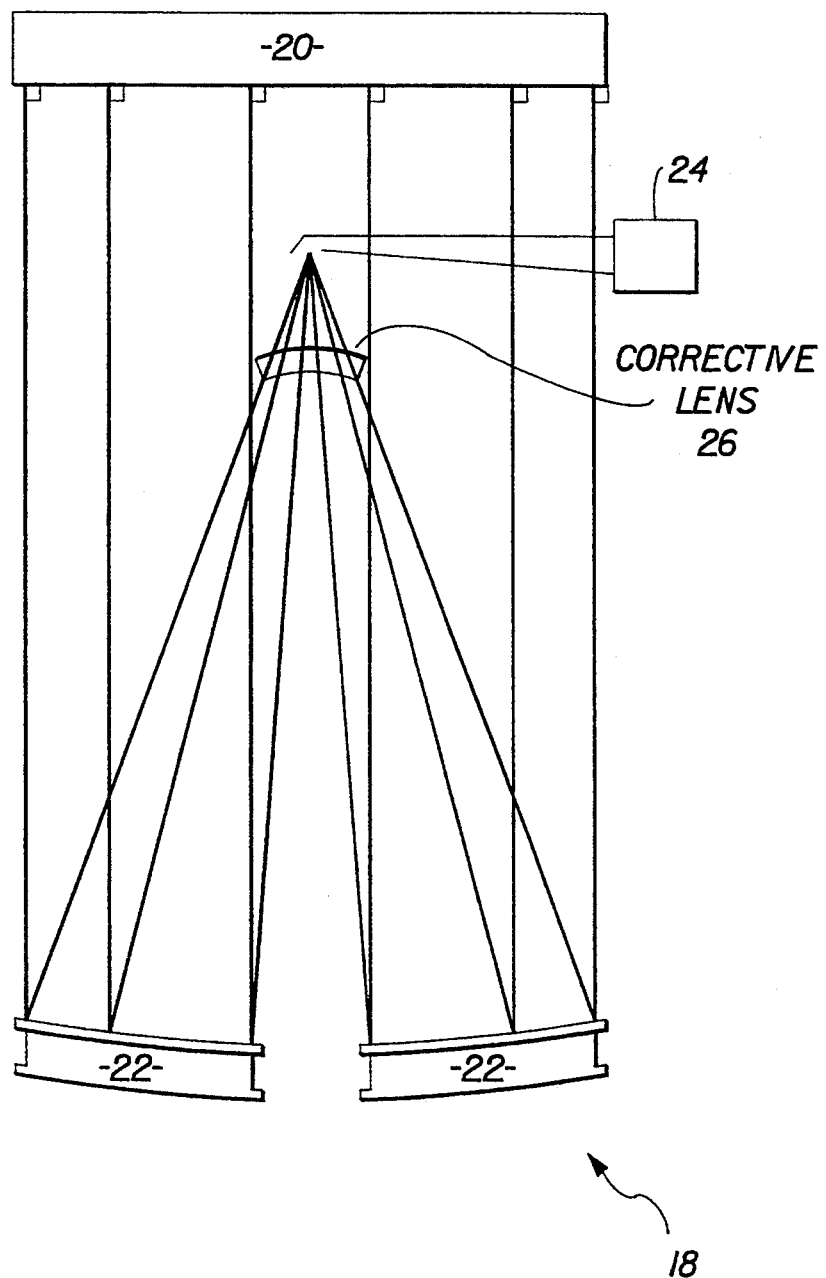
FIG. 5 shows an optical assembly that may be used to realize preferred steps of the method of the present invention.

The FIG. 5 optical assembly 18 comprises a portion of a conventional Ritchey-Chrétien telescope, and includes a flat mirror 20, and an optical element 22 comprising a large primary mirror defining an hyperboloidal geometry. The optical assembly 18 also includes a low profile conventional interferometer 24, and a small single element refractive correcting lens 26. The correcting lens 26 is preferably optically designed to correct a relatively small amount of spherical aberration associated with a relatively small amount of aparaboloidal departure of the hyperboloidal primary mirror 22, relative to a best-fit paraboloid. Two examples of preferred such correcting lenses 26 are illustrated in FIGS. 6A, B, numerals 28, 30, corresponding to the Ritchey-Chrétien primary mirrors of FIG. 4, supra. An algorithm for designing a lens is disclosed in an Appendix, infra.

Figure 6B:
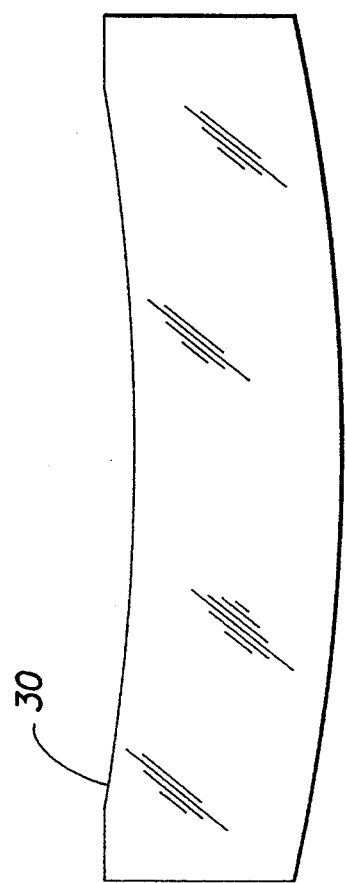
FIGS. 6 A,B show correcting lenses used in the present method.
Figure 6A:
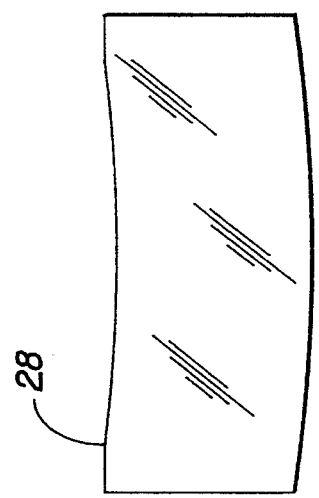

In operation, a FIG. 6 lens (28 or 30) is preferably located in the FIG. 5 optical assembly 18 between a focal point associated with the traditional classical test, (here, the interferometric autocollimation test), of a best-fit paraboloid in the autocollimation configuration. (Note, in this regard, that a customarily large and obtrusive aspheric reflective nulling mirror used in a conventional aspheric departure method, may be replaced by a simple lens e.g., a lens 28 or 30). The pseudo-autocollimation test now proceeds, consistent, otherwise, with classical steps, for assessing the surface figure of the optical element 22 as it simulates a paraboloid.

APPENDIX

Algorithm for Designing a Refractive Lens Element

A lens designer with accesss to a modern computer-assisted lens design program, can find a determination of an appropriate lens for use in the pseudo-autocollimation test. Outlined below is a method used by the inventors, to generate lenses providing excellent correction (to better than 0.001 wavelength) of the hyperboloid mirror of FIG. 5.

Step 1

Select a material for a lens element. A common optical glass is appropriate, for example BK7 crown. An especially good choice is FSV fused silica which is thermally stable.

Step 2

Select a lens thickness. A good choice is likely to be between ¼ to 1 percent of the vertex radius of curvature of a mirror to be tested.

Step 3

Select a radii of curvature of the lens surfaces. A good choice is likely to be between 10 and 20 times the lens thickness. The surface toward the mirror is convex. The other surface is concave.

Step 4

Select a separation between the lens and the vertex of the mirror to be tested. A good choice is between 46 and 48 percent of the vertex radius of curvature of the mirror to be tested.

Step 5

Enter the mirror-lens configuration into a commercial computerized lens-design program such as Genii II or Code V.

Step 6

Simulate an axial point offset at infinite distance, projecting light parallel to the axis of symmetry of the mirror.

Step 7

Utilize the computer optimization software to vary the radii of the lens surfaces independently to minimize spherical aberration.

Step 8

Examine the lens size and shape. If it is undesirably large, the separation between mirror and lens can be increased. Returning to Step 5 should then result in a smaller lens. If the radii of the lens surfaces are too short, the thickness of the lens can be increased. Returning to Step 5 should then result in longer radii for the lens surfaces. A viable alternative to the detailed lens described, is especially appropriate if a Fizeau interferometer is to be used as part of the test set (e.g., a Zygo interferometer). In this case, the correcting lens may be placed farther from the mirror than half its radius of curvature. Note that in this case, the concave surface is toward the mirror under test.

What is claimed:

1. A method for assessing a surface configuration of a concave conacoid optical element having a conic constant closer to the conic constant of a paraboloid than to the conic constant of a sphere, comprising the steps of:
 a. generating a correcting lens designed to correct spherical aberration associated with aparaboloidal departure of said optical element relative to a parabaloid mathematically best fit to the surface of said element;
 b. interposing said correcting lens between the surface of said concave conacoid optical element and a focal point of said element; and
 c. subjecting the optical element with correcting lens to a classical collimation testing procedure for ascertaining its surface configuration relative to said paraboloid.

2. The method of claim 1 wherein the conacoid optical element defines a hyperboloid.

3. The method of claim 1 wherein the conacoid optical element defines a prolate ellipsoid.

4. The method of claim 1 wherein said correcting lens provides a correction of the optical element to less than 0.001 wave length of visible light.

5. The method claimed in claim 1, wherein said step of generating a correcting lens comprises the steps of:
 a. selecting a material for a lens element;
 b. selecting a lens thickness;
 c. selecting radii of curvature of the lens surfaces;
 d. selecting a separation of the lens and the vertex of the optical element;
 e. entering the optical element-correcting lens configuration into a commercial computerized lens-design program;
 f. simulating an axial point offset at infinite distance, projecting light parallel to the axis of symmetry of the optical element;
 g. utilizing the lens-design program to vary the radii of the correcting lens surfaces independently to minimize spherical aberration; and
 h. examining the correcting lens size and shape and
  i. if it is undesirably large, increase the separation between the optical element and the correcting lens and repeat steps e through h,
  ii. if the radii of the correcting lens surfaces are too short, increase the thickness of the correcting lens and repeat steps e through h.

* * * * *